Nov. 19, 1929.   C. HEDDON   1,736,403
FISH BAIT
Filed Dec. 1, 1927
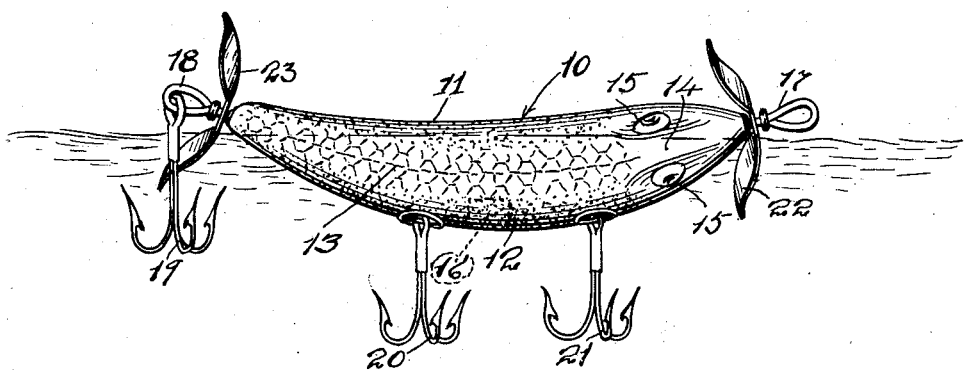
Inventor:
Charles Heddon
by Benning & Benning
Attys.

Patented Nov. 19, 1929

1,736,403

UNITED STATES PATENT OFFICE

CHARLES HEDDON, OF DOWAGIAC, MICHIGAN, ASSIGNOR TO JAMES HEDDON'S SONS, OF DOWAGIAC, MICHIGAN, A CORPORATION OF MICHIGAN

FISH BAIT

Application filed December 1, 1927. Serial No. 236,898.

The fish bait of the present invention is designed as a surface bait, being intended to simulate the appearance of a wounded minnow floating on its side. In order to better simulate a wounded minnow, and to give the effect of a struggle on the surface, the bait is preferably provided with spinners so mounted and arranged that they will extend partially out of the water so as to produce a splashing effect while rotating, and, at the same time, to produce a buzzing noise which further adds to the attractiveness of the bait.

Further objects and details will appear from a description of the invention in conjunction with the accompanying drawing wherein—

The figure illustrates the bait in the position occupied on the surface of the water.

The bait comprises a body 10 which is of generally ovate or cigar shaped configuration in simulation of the shape of a minnow body with the peculiarity, however, that the upper side 11 curves inwardly from end to end, while the lower surface 12 curves outwardly and downwardly on a more abrupt line of curvature, the configuration being such as to elevate the bait body at each end as it were, giving to the bait body the appearance of a bent or bowed minnow body lying on its side.

In the figure the line 13 represents the medial line along the back of a live minnow, while the upper and lower sides 11 and 12 represent the sides of the minnow body. 14 represents the head end which is preferably provided with eyes 15 which will be both presented on what may properly be termed the back of the bait, as indicated in the figure. In order to hold the bait in the position indicated, a lead slug or weight 16 may be embedded in the side 12 of the bait, which represents the bottom thereof when in floating position.

The bait is preferably finished with a scale finish or other surface marking intended to simulate the surface appearance of a live minnow. As shown, the bait is provided at its head end with a line tie 17 and at its tail end with an eye 18 which furnishes a point of connection for a tail gang 19, which tail gang in the present instance is associated with a rear gang 20 and a forward gang 21, which latter gangs depend from the wall 12 of the body.

A head spinner 22 is swivelled upon the shank of the line tie 17 and a tail spinner 23 is swivelled upon the shank of the eye 18, and these spinners are so disposed that they will be partly immersed in the water when the bait floats thereon, so that as the bait is drawn forward, the spinners will be caused to rotate which produce a splashing effect along the surface of the water, and, at the same time, cause a whirling or buzzing noise which adds to the effectiveness of the bait.

The bait as a whole is one which is configured and finished with a proper coloration to closely simulate the appearance of a minnow lying on its side with its head and tail slightly elevated, which is the position usually assumed by a wounded or disabled minnow, and the spinning action of the partially immersed spinners closely simulates the splashing of a wounded minnow on the surface. The position of the hooks assists in maintaining the body in properly balanced position, so that it may not be necessary to employ a lead insert, although the latter may be used if necessary to maintain a proper balance with the spinners in elevated relation.

Although in the construction of the bait it is preferred to use elevated spinners at the head and tail, it is contemplated that in some cases other accessory features may be employed in lieu of spinners, or these features may be omitted altogether in cases where they are not needed.

I claim:

1. A fish bait comprising a minnow shaped body substantially circular in cross-section bowed upwardly at each end and suitably constructed to float on one side on the surface of the water with the front and rear ends of the bait elevated above the surface of the water, substantially as described.

2. A fish bait comprising a minnow shaped body substantially circular in cross-section bowed upwardly at each end and suitably constructed to float on one side on the surface of the water with the front and rear ends of the bait elevated above the surface of the water, the body having surface markings and coloration in simulation of a minnow lying on its side with its head and tail flexed upwardly, substantially as described.

3. A fish bait comprising a minnow shaped body substantially circular in cross-section bowed upwardly at each end and suitably constructed to float on one side on the surface of the water with the front and rear ends of the bait elevated above the surface of the water, and a spinner swivelled at the forward end of the body in position to be partially immersed in the water to effect a splashing action when the bait is drawn through the water, substantially as described.

4. A fish bait comprising a minnow shaped body bowed upwardly at each end and suitably constructed to float on its side on the surface of the water with the major portion of the body submerged and the front and rear ends of the bait elevated above the surface of the water, the body having surface markings and coloration in simulation of a minnow lying on its side with its head and tail flexed upwardly, and a spinner swivelled at the forward end of the body in position to be partially immersed in the water to effect a splashing action when the bait is drawn through the water, substantially as described.

5. A fish bait comprising a minnow shaped body bowed upwardly at each end and suitably constructed to float on its side on the surface of the water with the major portion of the body submerged and the front and rear ends of the bait elevated above the surface of the water, the body having surface markings and coloration in simulation of a minnow lying on its side with its head and tail flexed upwardly, a spinner swivelled at the forward end of the body in position to be partially immersed in the water to effect a splashing action when the bait is drawn through the water, and a spinner similarly mounted at the opposite end of the bait, substantially as described.

6. A fish bait comprising a minnow shaped body having its head and tail ends flexed upwardly to occupy an elevated position with respect to the remainder of the body when the bait is floating on its side on the surface of the water, the bait body having surface markings in coloration to simulate a minnow floating on its side, a gang hook secured to that simulated side of the bait which occupies the lowermost position in the water, a line tie extending forwardly from the head of the bait, and a spinner swivelled on said line tie and positioned to be partially submerged in the water when the minnow is floating thereon, substantially as described.

7. A fish bait comprising a minnow shaped body having its head and tail ends flexed upwardly to occupy an elevated position with respect to the remainder of the body when the bait is floating on its side on the surface of the water, the bait body having surface markings in coloration to simulate a minnow floating on its side, a gang hook secured to that simulated side of the bait which occupies the lowermost position in the water, a line tie extending forwardly from the head of the bait, a spinner swivelled on said line tie and positioned to be partially submerged in the water when the minnow is floating thereon, a tail hook secured to the opposite end of the body, and a spinner swivelled at said end and positioned to be partially submerged in the water, substantially as described.

CHARLES HEDDON.